United States Patent
Elbaz et al.

(10) Patent No.: US 6,757,005 B1
(45) Date of Patent: *Jun. 29, 2004

(54) METHOD AND SYSTEM FOR MULTIMEDIA VIDEO PROCESSING

(75) Inventors: Moshe Elbaz, Kiriat Bialik (IL); Noam Eshkoli, Ra'anana (IL); Ilan Yona, Tel Aviv (IL); Aviv Eiesenberg, Be'er Sheva (IL)

(73) Assignee: Polycom Israel, Ltd. (IL)

(*) Notice: Subject to any disclaimer, the term of this patent is extended or adjusted under 35 U.S.C. 154(b) by 0 days.

This patent is subject to a terminal disclaimer.

(21) Appl. No.: 09/952,339

(22) Filed: Sep. 14, 2001

Related U.S. Application Data

(63) Continuation-in-part of application No. 09/506,861, filed on Jan. 13, 2000, now Pat. No. 6,300,973.

(51) Int. Cl.⁷ ................................................ H04N 7/14
(52) U.S. Cl. .................................. 348/14.09; 348/14.12
(58) Field of Search ........................ 348/14.07–14.13; 379/202.01; 370/259–262, 395.21

(56) References Cited

U.S. PATENT DOCUMENTS

| | | | |
|---|---|---|---|
| 5,136,581 A | * 8/1992 | Muehrcke | ................. 348/14.09 |
| 5,216,503 A | 6/1993 | Paik et al. | ................... 358/133 |
| 5,408,274 A | 4/1995 | Chang et al. | |
| 5,453,780 A | 9/1995 | Chen et al. | |
| 5,563,882 A | 10/1996 | Bruno et al. | |
| 5,585,850 A | * 12/1996 | Schwaller | |
| 5,600,646 A | 2/1997 | Polomski | |
| 5,680,392 A | 10/1997 | Semaan | |
| 5,684,527 A | 11/1997 | Terui et al. | |
| 5,708,732 A | 1/1998 | Merhav et al. | |
| 5,751,338 A | 5/1998 | Ludwig, Jr. | |
| 5,796,434 A | 8/1998 | Lempel | |
| 5,832,135 A | 11/1998 | Merhav et al. | |
| 5,838,664 A | 11/1998 | Polomski | .................... 370/263 |
| 5,862,329 A | 1/1999 | Aras et al. | |
| 5,872,922 A | 2/1999 | Hogan et al. | |
| 5,886,734 A | * 3/1999 | Ozone et al. | ............ 348/14.09 |
| 5,951,637 A | 9/1999 | Kuzma | |
| 5,961,589 A | 10/1999 | Hansen | |
| 5,963,547 A | 10/1999 | O'Neil | |
| 5,995,490 A | * 11/1999 | Shaffer et al. | |
| 6,154,778 A | * 11/2000 | Koistinen et al. | |
| 6,219,412 B1 | * 4/2001 | Wellner et al. | ........ 379/202.01 |
| 6,535,592 B1 | * 3/2003 | Snelgrove | |

FOREIGN PATENT DOCUMENTS

EP  0 711 080 A2  5/1996  ............ H04N/7/50

OTHER PUBLICATIONS

Ezenia—Encounter.TM.—Innovative technology, award-winning products.

* cited by examiner

*Primary Examiner*—Wing Chan
(74) *Attorney, Agent, or Firm*—Wong, Cabello, Lutsch, Rutherford & Brucculeri L.L.P.

(57) ABSTRACT

An improved method and a system of utilizing the decoding/encoding video resources of a Video Processing Device (VPD) by offering a distributed architecture. A conventional VPD comprises a plurality of video ports, each video port is dedicated to a user and comprises at least one decoder and one encoder. The distributed VPD comprises a plurality of input ports and a plurality of output ports. Each input port includes an input module. The input module is operative to receive a compressed video input stream, manipulate the compressed video stream into a primary stream and optionally generate a secondary data stream associated with the primary data stream. A variety of levels of service for a session can be offered. A client may select the number of ports that will be used by the session. For example, a single port may multicast its compressed output video stream to all the destinations within a session, or to all destinations within a plurality of ports. The multicasting may be such that there is anywhere from one port for each group of destinations using the same compressed video stream to one port for each user.

39 Claims, 8 Drawing Sheets

METHOD AND SYSTEM FOR MULTIMEDIA VIDEO PROCESSING

RELATED APPLICATIONS

This application is a continuation-in-part of U.S. patent application Ser. No. 09/506,861, filed Jan. 13, 2000, which issued as U.S. Pat. No. 6,300,973 on Oct. 9, 2001, the contents of which are incorporated herein by reference.

FIELD OF THE INVENTION

The present invention relates to digital manipulations of video data like but not limited to: transcoding, mixing multiple streams, etc. wherein the input and the output streams are compressed.

BACKGROUND

A Video Processing Device (VPD) like but not limited to a Multipoint Control Unit (MCU), a Multimedia Gateway, compressed video mixer etc, is a device that manipulates compressed video input streams into a compressed video output stream.

An MCU receives multiple audio/video streams from various users' terminals, or codecs, and transmits to various users' terminals audio/video streams that correspond to the desired stream at the users' stations. In some cases, where the MCU serves as a switchboard, the transmitted stream to the end terminal is a simple stream originating from a single other user and may be transformed, when needed, to meet the receiver user endpoint needs. In other cases, it is a combined "conference" stream composed of several users' streams. In other cases when a transcoding is needed, the MCU modifies the output stream according to the needs, (bit rate, frame rate, standard of compression etc.) of its terminal.

Another example for a VPD is a Media Gateway; a Media Gateway (GW) is a node on the network that provides for real-time, two-way communications between Terminals on one network with other terminals on another network, or to another VPD.

Another example for a VPD is a digital compressed video mixer, which replaces an analog video mixer.

An important function of the VPD is to translate the input streams into the desired output streams from all and to all codecs. One aspect of this "translation" is a modification of the bit-rate between the original stream and the output stream. This rate matching modification can be achieved, for example, by changing the frame rate, the spatial resolution, or the quantization accuracy of the corresponding video. The output bit-rate, and thus the modified factor used to achieve the output bit rate, can be different for different users, even for the same input stream. For instance, in a four party conference, one of the parties may be operating at 128 Kbps, another at 256 Kbps, and two others at T1. Each party needs to receive the transmission at the appropriate bit rate. The same principles apply to "translation", or transcoding, between parameters that vary between codecs, e.g., different coding standards like H.261/H263; different input resolutions; and different maximal frame rates in the input streams.

Another use of the VPD can be to construct an output stream that combines several input streams. This option, sometimes called "compositing" or "continuous presence," allows a user at a remote terminal to observe, simultaneously, several other video sources. The choice of those sources can vary among different video channels. In this situation, the amount of bits allocated to each video source can also vary, and may depend on the on screen activity of the users, on the specific resolution given to the channel, or some other criterion.

All of this elaborate processing, e.g., transcoding and continuous presence processing, must be done under the constraint that the input streams are already compressed by a known compression method, usually based on a standard like but not limited to ITU's H.261 or H.263. These standards, as well as other video compression standards like MPEG, are generally based on a Discrete Cosine Transform ("DCT") process wherein the blocks of the image (video frame) are transformed, and the resulting transform coefficients are quantized and coded.

One prior art method first decompresses the video streams; performs the required combination, bridging and image construction either digitally or by other means; and finally re-compresses for transmission. This method requires high computation power, leads to degradation in the resulting video quality and suffers from large propagation delay. One of the most computation intensive portions of the prior art methods is the encoding portion of the operation where such things as motion vectors and DCT coefficients have to be generated so as to take advantage of spatial and temporal redundancies. For instance, to take advantage of spatial redundancies in the video picture, the DCT function can be performed. To generate DCT coefficients, each frame of the picture is broken into blocks and the discrete cosine transform function is performed upon each block. In order to take advantage of temporal. redundancies, motion vectors can be generated. To generate motion vectors, consecutive frames are compared to each other in an attempt to discern pattern movement from one frame to the next. As would be expected, these computations require a great deal of computing power.

In order to reduce computation complexity and increase quality, others have searched for methods of performing such operations in a more efficient manner. Proposals have included operating in the transform domain on motion compensated, DCT compressed video signals by removing the motion compensation portion and compositing in the DCT transform domain.

In particular resources allocation of prior art VPDs is based on a straightforward approach e.g. a video codec is allocated to a single user terminal although it may serve more than one.

Therefore, a method is needed for performing better video resources allocation.

SUMMARY

The present invention relates to an improved method and a system of utilizing the decoding/encoding video resources of a VPD by offering a distributed architecture. A conventional VPD comprises a plurality of video ports in which each video port is dedicated to a user, and each video port comprises at least one decoder and one encoder. The distributed VPD comprises a plurality of input ports and a plurality of output ports. Each input port comprises an input module. The input module may operate to receive a compressed video input stream, manipulate the compressed video stream into a primary stream, and optionally generate a secondary data stream associated with the primary data stream.

Each input port may be dedicated to a single source, for the entire duration of a session or may be switched between sources during a session. An Output port may transmit the compressed video output to a single destination or to more than one destination or may be switch between destinations during a session.

Another aspect of the present invention is offering a variety of level of services for a session. A client may select the number of ports that will be used by the session. For example a single port may multicast its compressed output video stream to all the destinations within a session, or plurality of ports, one per group of destinations that may use the same compressed video stream up to one port per each user.

FIGURES

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION

The description of the present invention refers to an MCU as an exemplary VPD. Those skilled in the art will appreciate that the present invention is not limited to an MCU and that it can be used in other VPDs such as, but not limited to, a Media Gateway, a compressed video mixer. In the case of devices other than an MCU, the endpoint can be any source of compressed video stream or any destination of a compressed video stream, and any session having a compressed video manipulation may be substituted where a video-conference is recited.

An MCU is used where multiple users at endpoint codecs communicate in a simultaneous video-conference. A user at a given endpoint may simultaneously view multiple endpoint users at his discretion. In addition, the endpoints may communicate at differing data rates using different coding standards, so the MCU facilitates transcoding of the video signals between these endpoints.

Figure 1:
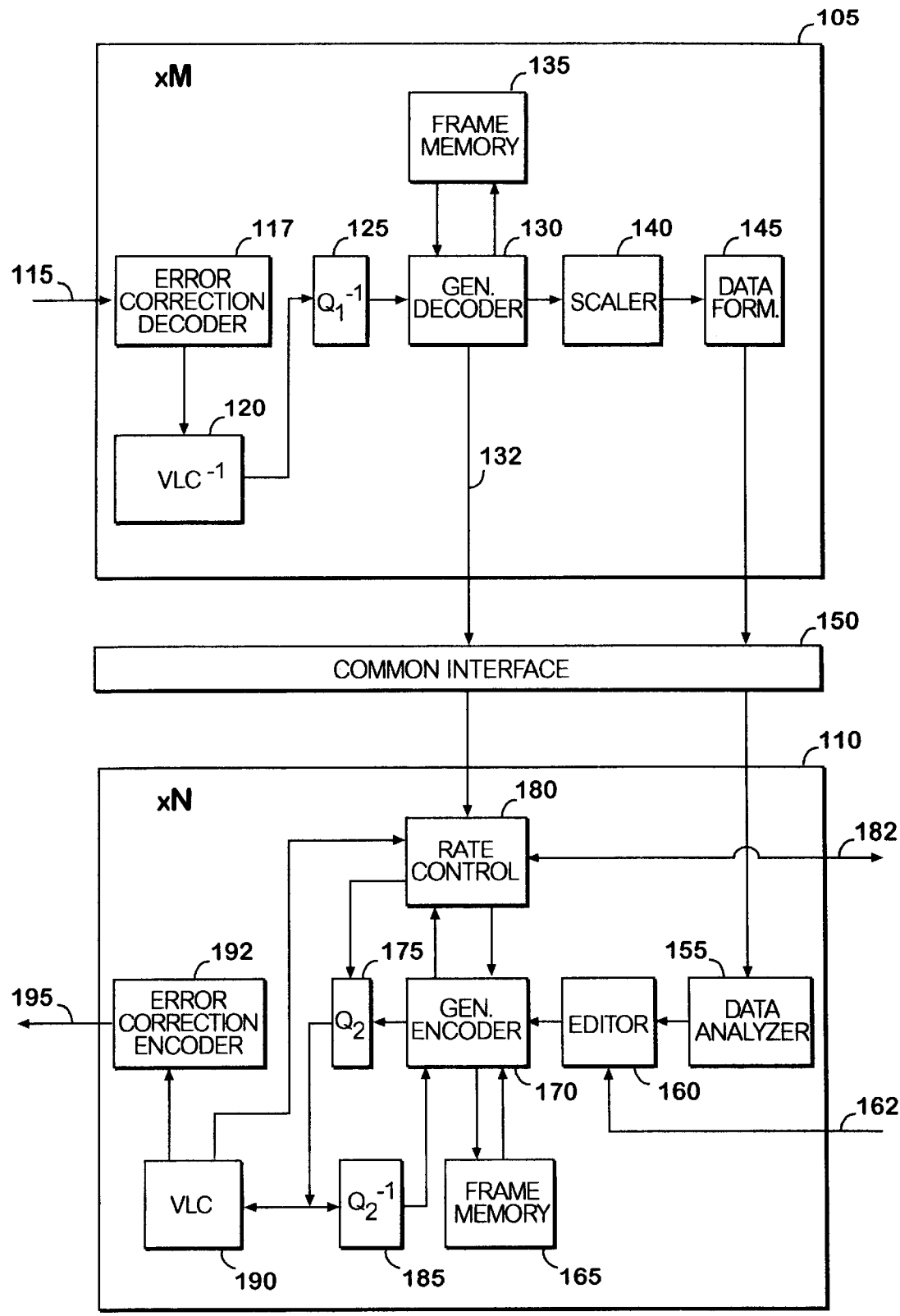
FIG. 1 illustrates a system block diagram for implementation of an exemplary embodiment of the general function of this invention.

FIG. 1 illustrates a system block diagram for implementation of an exemplary embodiment of the general function of the invention. In an MCU, compressed video input 115 from a first endpoint codec is brought into a video input module 105, routed through a common interface 150, and directed to a video output module 110 for transmission as compressed video output 195 to a second endpoint codec. The common interface 150 may include any of a variety of interfaces, such as shared memory, ATM bus, TDM bus, switching and direct connection. The invention contemplates that there will be a plurality of endpoints enabling multiple users to participate in a video-conference. For each endpoint, a video input module 105 and a video output module 110 may be assigned. Common interface 150 facilitates the transfer of video information between multiple video input modules 105 and multiple video output modules 110.

Compressed Video 115 is sent to error correction block decoder 117 within video input module 105. Error correction decoder block 117 takes the incoming compressed video 115 and removes the error correction code. An example of an error correction code is BCH coding. This error correction block 117 is optional and may not be needed with certain codecs.

The video stream is next routed to the variable length unencoder, $VLC^{-1}$ 120, for decoding the variable length coding usually present within the compressed video input stream. Depending on the compression used (H.261, H.263, MPEG etc.) it recognizes the stream header markers and the specific fields associated with the video frame structure. Although the main task of the $VLC^{-1}$ 120 is to decode this variable length code and prepare the data for the following steps, $VLC^{-1}$ 120 may take some of the information it receives, e.g., stream header markers and specific field information, and pass this information on to later function blocks in the system.

The video data of the incoming stream contains quantized DCT coefficients. After decoding the variable length code, $Q^{-1}$ 125 dequantizes the representation of these coefficients to restore the numerical value of the DCT coefficients in a well known manner. In addition to dequantizing the DCT coefficients, $Q^{-1}$ 125 may pass through some information, such as the step size, to other blocks for additional processing.

Generalized decoder 130 takes the video stream received from the $VLC^{-1}$ 120 through $Q^{-1}$ 125 and based on the frame memory 135 content, converts it into "generalized decoded" frames (according to the domain chosen for transcoding). The generalized decoder 130 then generates two streams: a primary data stream and a secondary data stream. The primary data stream can be either frames represented in the image (spatial) domain, frames represented in the DCT domain, or some variation of these, e.g., error frames. The secondary data stream contains "control" or "side information" associated with the primary stream and may contain motion vectors, quantizer identifications, coded/uncoded decisions, filter/non-filter decisions, frame type, resolution and other information that would be useful to the encoding of a video signal.

For example, for every macro block, there may be an associated motion vector. Reuse of the motion vectors can reduce the amount of computations significantly. Quantizer values are established prior to the reception of encoded video 115. Reuse of quantizer values, when possible, can allow generalized encoder 170 to avoid quantization errors and send the video coefficients in the same form as they entered the generalized decoder 130. This configuration avoids quality degradation. In other cases, quantizer values may serve as first guesses during the reencoding process. Statistical information can be sent from the generalized decoder 130 over the secondary data stream. Such statistical information may include data about the amount of information within each macroblock of an image. In this way, more bits may later be allocated by rate control unit 180 to those macroblocks having more information.

Because filters may be used in the encoding process, extraction of filter usage information in the generalized decoder 130 also can reduce the complexity of processing in the generalized encoder 170. While the use of filters in the encoding process is a feature of the H.261 standard, it will be appreciated that the notion of the reuse of filter information should be read broadly to include the reuse of information used by other artifact removal techniques.

In addition, the secondary data stream may contain decisions made by processing the incoming stream, such as image segmentation decisions and camera movements identification. Camera movements include such data as pan, zoom and other general camera movement information. By providing this information over the secondary data stream, the generalized encoder 170 may make a better approximation when re-encoding the picture by knowing that the image is being panned or zoomed.

This secondary data stream is routed over the secondary (Side Information) channel 132 to the rate control unit 180 for use in video output block 110. Rate control unit 180 is responsible for the efficient allocation of bits to the video stream in order to obtain maximum quality while at the same time using the information extracted from generalized decoder 130 within the video input block 105 to reduce the total computations of the video output module 110.

The scaler 140 takes the primary data stream and scales it. The purpose of scaling is to change the frame resolution in order to later incorporate it into a continuous presence frame. Such a continuous presence frame may consist of a plurality of appropriately scaled frames. The scaler 140 also applies proper filters for both decimation and picture quality preservation. The scaler 140 may be bypassed if the scaling function is not required in a particular implementation or usage.

The data formatter 145 creates a representation of the video stream. This representation may include a progressively compressed stream. In a progressively compressed stream, a progressive compression technique, such as wavelet based compression, represents the video image in an increasing resolution pyramid. Using this technique, the scaler 140 may be avoided and the data analyzer and the editor 160, may take from the common interface only the amount of information that the editor requires for the selected resolution.

The data formatter 145 facilitates communication over the common interface and assists the editor 160 in certain embodiments of the invention. The data formatter 145 may also serve to reduce the bandwidth required of the common interface by compressing the video stream. The data formatter 145 may be bypassed if its function is not required in a particular embodiment.

When the formatted video leaves data formatter 145 of the video input block, it is routed through common interface 150 to the data analyzer 155 of video output block 110. Routing may be accomplished through various means including busses, switches or memory.

The data analyzer 155 inverts the representation created by the data formatter 145 into a video frame structure. In the case of progressive coding, the data analyzer 155 may take only a portion of the generated bit-stream to create a reduced resolution video frame. In embodiments where the data formatter 145 is not present or is bypassed, the data analyzer 155 is not utilized.

After the video stream leaves the data analyzer 155, the editor 160 can generate the composite video image. It receives a plurality of video frames; it may scale the video frame (applying a suitable filter for decimation and quality), and/or combine various video inputs into one video frame by placing them inside the frame according to a predefined or user defined screen layout scheme. The editor 160 may receive external editor inputs 162 containing layout preferences or text required to be added to the video frame, such as speech translation, menus, or endpoint names. The editor 160 is not required and may be bypassed or not present in certain embodiments not requiring the compositing function.

The rate control unit 180 controls the bit rate of the outgoing video stream. The rate control operation is not limited to a single stream and can be used to control multiple streams in an embodiment comprising a plurality of video input modules 105. The rate control and bit allocation decisions are made based on the activities and desired quality for the output stream. A simple feedback mechanism that monitors the total amount of bits to all streams can assist in these decisions. In effect, the rate control unit becomes a statistical multiplexer of these streams. In this fashion, certain portions of the video stream may be allocated more bits or more processing effort.

In addition to the feedback from generalized encoder 170, feedback from VLC 190, and side information from the secondary channel 132, as well as external input 182 all may be used to allow a user to select certain aspects of signal quality. For instance, a user may choose to allocate more bits of a video stream to a particular portion of an image in order to enhance clarity of that portion. The external input 182 is a bi-directional port to facilitate communications from and to an external device.

In addition to using the side information from the secondary channel 132 to assist in its rate control function, rate control unit 180 may, optionally, merely pass side information directly to the generalized encoder 170. The rate control unit 180 also assists the quantizer 175 with quantizing the DCT coefficients by identifying the quantizer to be used.

Generalized encoder 170 basically performs the inverse operation of the generalized decoder 130. The generalized encoder 170 receives two streams: a primary stream, originally generated by one or more generalized decoders, edited and combined by the editor 160; and a secondary stream of relevant side information coming from the respective generalized decoders. Since the secondary streams generated by the generalized decoders are passed to the rate-control function 180, the generalized encoder 170 may receive the side information through the rate control function 180 either in its original form or after being processed. The output of the generalized encoder 170 is a stream of DCT coefficients and additional parameters ready to be transformed into a compressed stream after quantization and VLC.

The output DCT coefficients from the generalized encoder 170 are quantized by $Q_2$ 175, according to a decision made by the rate control unit 180. These coefficients are fed back to the inverse quantizer block $Q_2^{-1}$ 185 to generate, as a reference, a replica of what the decoder at the endpoint codec would obtain. This reference is typically the sum of the coefficients fed back to the inverse quantizer block and the content of the frame memory 165. This process of producing a replica as a reference reduces error propagation.

Now, depending on the domain used for encoding, the difference between the output of the editor 160 and the motion compensated reference (calculated either in the DCT or spatial domain) is encoded into DCT coefficients, which are the output of the generalized encoder 170.

The VLC 190, or variable length coder, removes the remaining redundancies from the quantized DCT coefficients stream by using lossless coding tables defined by the chosen standard (H.261, H.263 . . . ). VLC 190 also inserts the appropriate motion vectors, the necessary headers and synchronization fields according to the chosen standard. The VLC 190 also sends to the Rate Control Unit 180 the data on the actual amount of bits used after variable length coding.

The error correction encoder 192 next receives the video stream and inserts the error correction code. In some cases this may be BCH coding. This error correction encoder 192 block is optional and, depending on the codec, may be bypassed. Finally, it sends the stream to the end user codec for viewing.

In order to more fully describe aspects of the invention, further detail on the generalized decoder 130 and the generalized encoder 170 follows.

Figure 2:
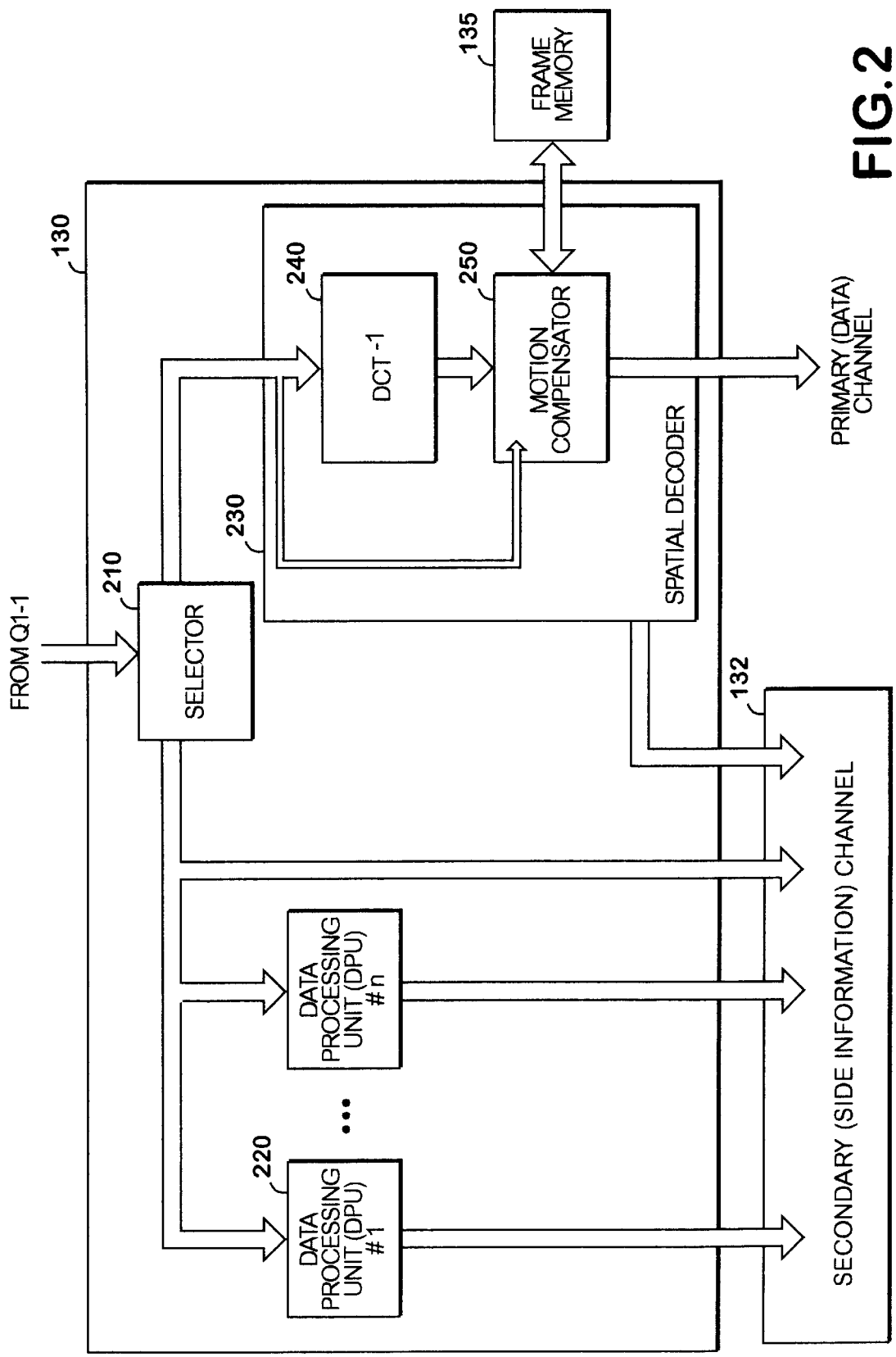
FIG. 2 illustrates a block diagram of an exemplary embodiment of a generalized decoder.

FIG. 2 illustrates a block diagram of an exemplary embodiment of a generalized decoder 130. Dequantized video is routed from the dequantizer 125 to the Selector 210 within the generalized decoder 130. The Selector 210 splits the dequantized video stream, sending the stream to one or more data processors 220 and a spatial decoder 230. The data processors 220 calculate side information, such as statistical information like pan and zoom, as well as quantizer values and the like, from the video stream. The data processors 220 then pass this information to the side information channel 132. A spatial decoder 230, in conjunction with frame memory 135 (shown in FIG. 1) fully or partially decodes the compressed video stream. The DCT decoder 240, optionally, performs the inverse of the discrete cosine transfer function. The motion compensator 250, optionally, in conjunction with frame memory 135 (shown in Fig. 1) uses the motion vectors as pointers to a reference block in the reference frame to be summed with the incoming residual information block. The fully or partially decoded video stream is then sent along the primary channel to the scaler 140, shown in FIG. 1, for further processing. Side information is transferred from spatial decoder 230 via side channel 132 for possible reuse at rate control unit 180 and generalized encoder 170.

Figure 3:
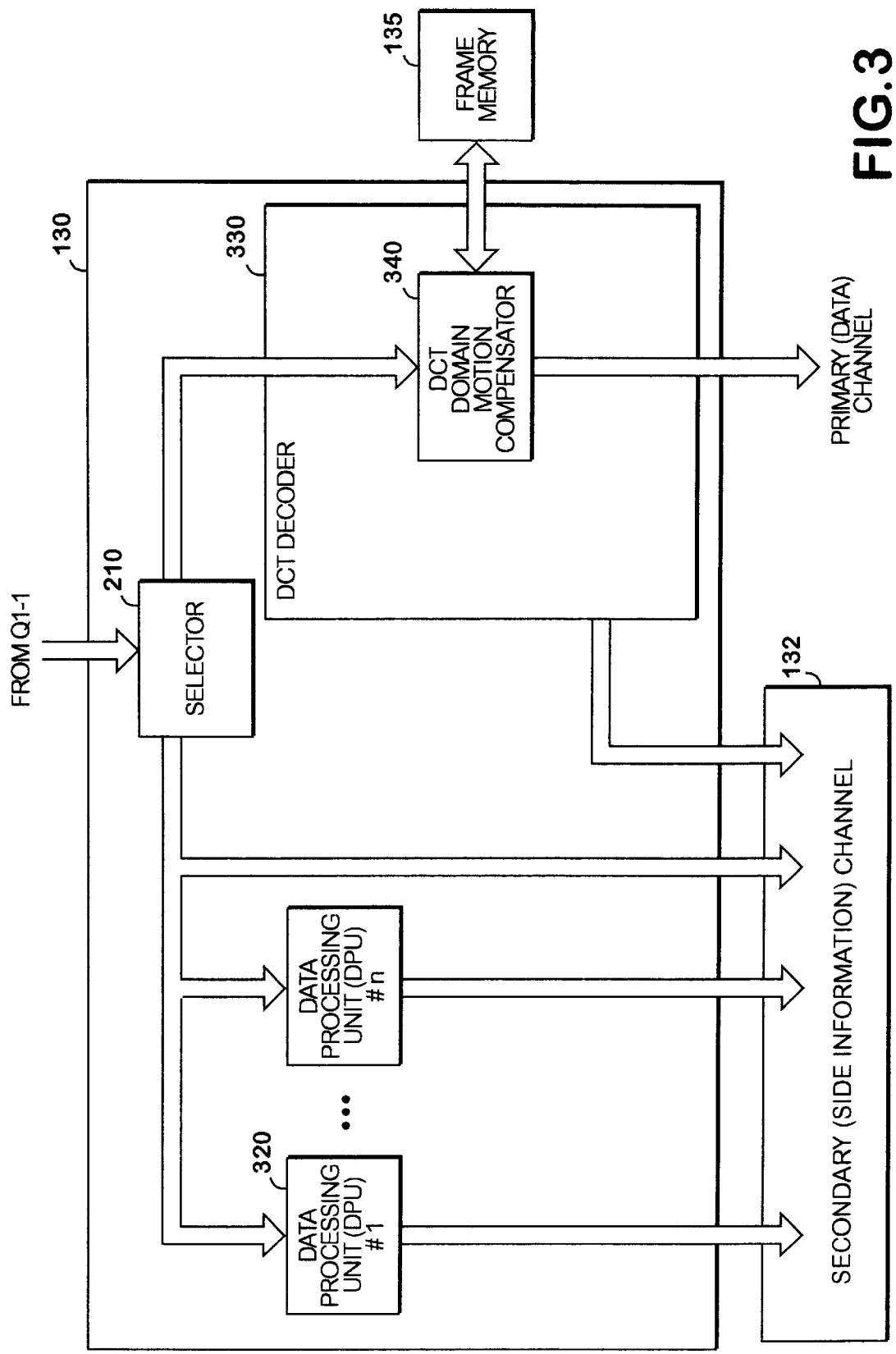
FIG. 3 illustrates a block diagram of another exemplary embodiment of a generalized decoder.

FIG. 3 illustrates a block diagram of another exemplary embodiment of a generalized decoder 130. Dequantized video is routed from dequantizer 125 to the selector 210 within generalized decoder 130. The selector 210 splits the dequantized video stream sending the stream to one or more data processors 320 and DCT decoder 330. The data processors 320 calculate side information, such as statistical information like pan and zoom, as well as quantizer values and the like, from the video stream. The data processors 320 then pass this information through the side information channel 132. The DCT decoder 330 in conjunction with the frame memory 135, shown in FIG. 1, fully or partially decodes the compressed video stream using a DCT domain motion compensator 340 which performs, in the DCT domain, calculations needed to sum the reference block pointed to by the motion vectors in the DCT domain reference frame with the residual DCT domain input block. The fully or partially decoded video stream is sent along the primary channel to the scaler 140, shown in FIG. 1, for further processing. Side information is transferred from the DCT decoder 330 via the side channel 132 for possible reuse at the rate control unit 180 and the generalized encoder 170.

Figure 4:
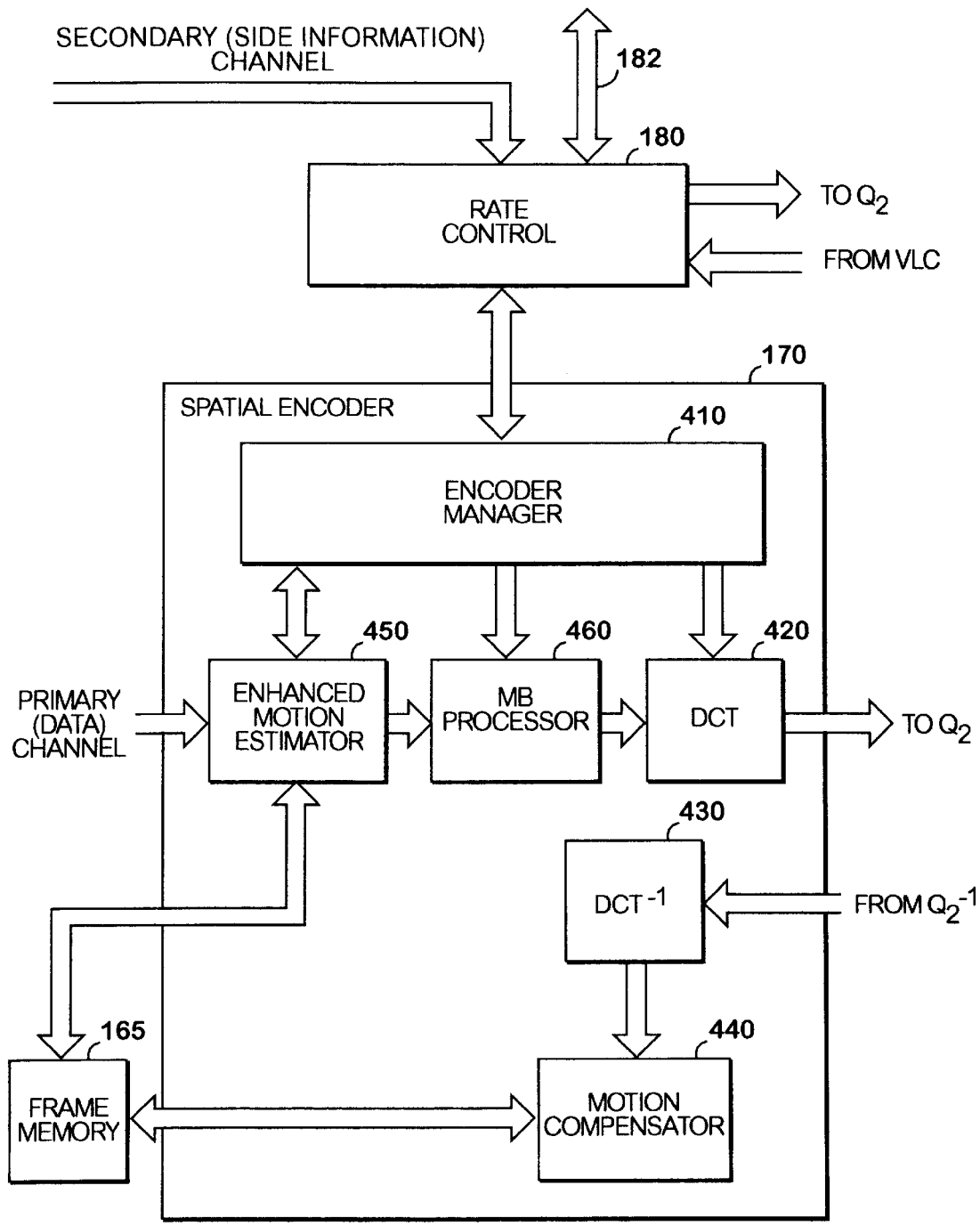
FIG. 4 illustrates a block diagram of an exemplary embodiment of a generalized encoder/operating in the spatial domain.

FIG. 4 illustrates a block diagram of an exemplary embodiment of a generalized encoder 170 operating in the spatial domain. The generalized encoder's first task is to determine the motion associated with each macroblock of the received image over the primary data channel from the editor 160. This is performed by the enhanced motion estimator 450. The enhanced motion estimator 450 receives motion predictors that originate in the side information, processed by the rate control fiction 180 and sent through the encoder manager 410 to the enhanced motion estimator 450. The enhanced motion estimator 450 compares, if needed, the received image with the reference image that exists in the frame memory 165 and finds the best motion prediction in the environment in a manner well known to those skilled in the art. The motion vectors, as well as a quality factor associated with them, are then passed to the encoder manager 410. The coefficients are passed on to the MB processor 460.

The MB, or macroblock, processor 460 is a general purpose processing unit for the macroblock level wherein one of its many functions is to calculate the difference MB. This is done according to an input coming from the encoder manager 410, in the form of indications whether to code the MB or not, whether to use a de-blocking filter or not, and other video parameters. In general, responsibility of the MB processor 460 is to calculate the macroblock in the form that is appropriate for transformation and quantization. The output of the MB processor 460 is passed to the DCT coder 420 for generation of the DCT coefficients prior to quantization.

All these blocks are controlled by the encoder manager 410. It decides whether to code or not to code a macroblock; it may decide to use some de-blocking filters; it gets quality results from the enhanced motion estimator 450; it serves to control the DCT coder 420; and it serves as an interface to the rate-control block 180. The decisions and control made by the encoder manager 410 are subject to the input coming from the rate control block 180.

The generalized encoder 170 also contains a feedback loop. The purpose of the feedback loop is to avoid error propagation by reentering the frame as seen by the remote decoder and referencing it when encoding the new frame. The output of the encoder which was sent to the quantization block is decoded back by using an inverse quantization block, and then fed back to the generalized encoder 170 into the inverse DCT 430 and motion compensation blocks 440, generating a reference image in the frame memory 165.

Figure 5:
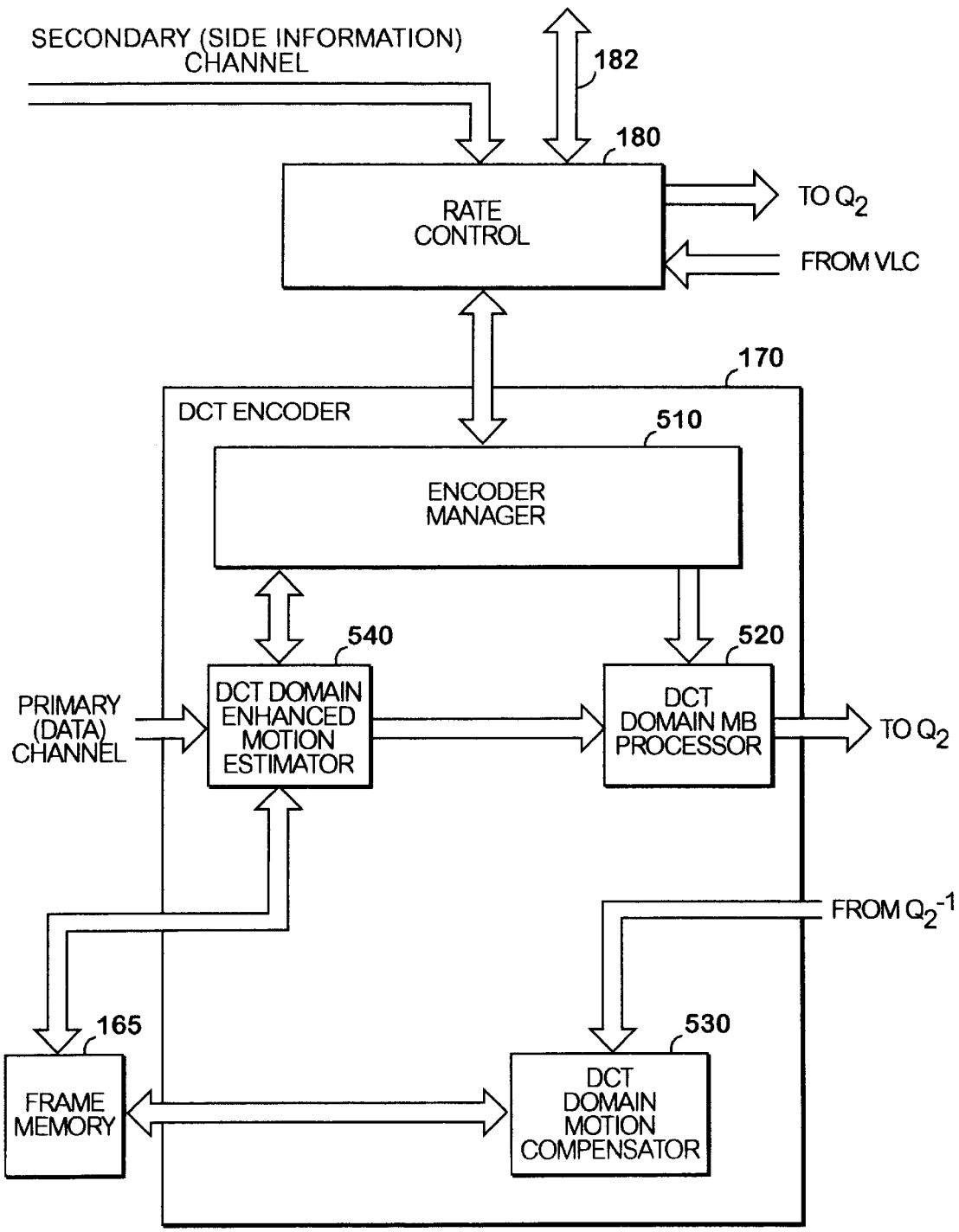
FIG. 5 illustrates a block diagram of an exemplary embodiment of a generalized encoder/operating in the DCT domain.

FIG. 5 illustrates a block diagram of a second exemplary embodiment of a generalized encoder 170 operating in the DCT domain. The generalized encoder's first task is to determine the motion associated with each macroblock of the received image over the primary data channel from the editor 160. This is performed by the DCT domain enhanced motion estimator 540. The DCT domain enhanced motion estimator 540 receives motion predictors that originate in the side information channel, processed by rate control function 180 and sent through the encoder manager 510 to the DCT domain enhanced motion estimator 540. It compares, if needed, the received image with the DCT domain reference image that exists in the frame memory 165 and finds the best motion prediction in the environment. The motion vectors, as well as a quality factor associated with them, are then passed to the encoder manager 510. The coefficients are passed on to the DCT domain MB processor 520.

The DCT domain macroblock, or MB, processor 520 is a general purpose processing unit for the macroblock level, wherein one of its many functions is to calculate the difference MB in the DCT domain. This is done according to an input coming from the encoder manager 510, in the form of indications whether to code the MB or not, to use a de-blocking filter or not, and other video parameters. In general, the DCT domain MB processor 520 responsibility is to calculate the macroblock in the form that is appropriate for transformation and quantization.

All these blocks are controlled by the encoder manager 510. The encoder manager 510 decides whether to code or not to code a macroblock; it may decide to use some de-blocking filters; it gets quality results from the DCT domain enhanced motion estimator 540; and it serves as an interface to the rate control block 180. The decisions and control made by the encoder manager 510 are subject to the input coming from the rate control block 180.

The generalized encoder 170 also contains a feedback loop. The output of the encoder which was sent to the quantization block is decoded back, by using an inverse quantization block and then fed back to the DCT domain motion compensation blocks 530, generating a DCT domain reference image in the frame memory 165.

While the generalized encoder 170 has been described with reference to a DCT domain configuration and a spatial domain configuration, it will be appreciated by those skilled in the art that a single hardware configuration may operate in either the DCT domain or the spatial domain. This invention is not limited to either the DCT domain or the spatial domain but may operate in either domain or in the continuum between the two domains.

Figure 6:
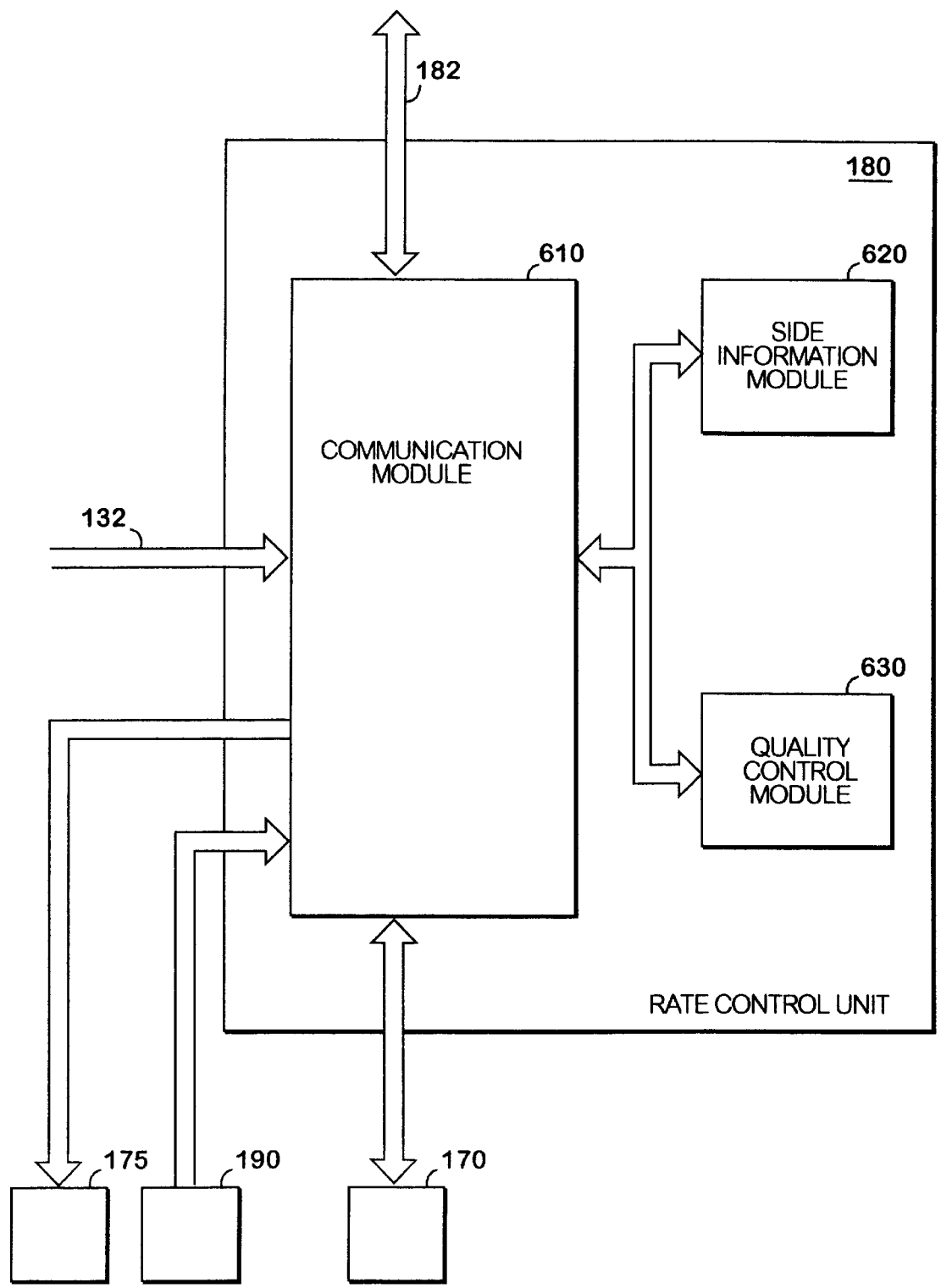
FIG. 6 illustrates an exemplary embodiment of a rate control unit for operation with an embodiment of the present invention.

FIG. 6 illustrates an exemplary embodiment of a rate control unit for operation with an embodiment of the present invention. Exemplary rate control unit 180 controls the bit rate of the outgoing video stream. As was stated previously, the rate control operation can apply joint transcoding of multiple streams. Bit allocation decisions are made based on the activities and desired quality for the various streams assisted by a feedback mechanism that monitors the total amount of bits to all streams. Certain portions of the video stream may be allocated more bits or more processing time.

The rate control unit 180 comprises a communication module 610, a side information module 620, and a quality control module 630. The communication module 610 interfaces with functions outside of the rate control unit 180. The communication module 610 reads side information from the secondary channel 132, serves as a two-way interface with the external input 182, sends the quantizer level to a quantizer 175, reads the actual number of bits needed to encode the information from the VLC 190, and sends instructions and data and receives processed data from the generalized encoder 170.

The side information module 620 receives the side information from all appropriate generalized decoders from the communication module 610 and arranges the, information for use in the generalized encoder. Parameters generated in the side information module 620 are sent via communication module 610 for further processing in the general encoder 170.

The quality control module 630 controls the operative side of the rate control block 180. The quality control module 630 stores the desired and measured quality parameters. Based on these parameters, the quality control module 630 may instruct the side information module 620 or the generalized encoder 170 to begin certain tasks in order to refine the video parameters.

Figure 7:
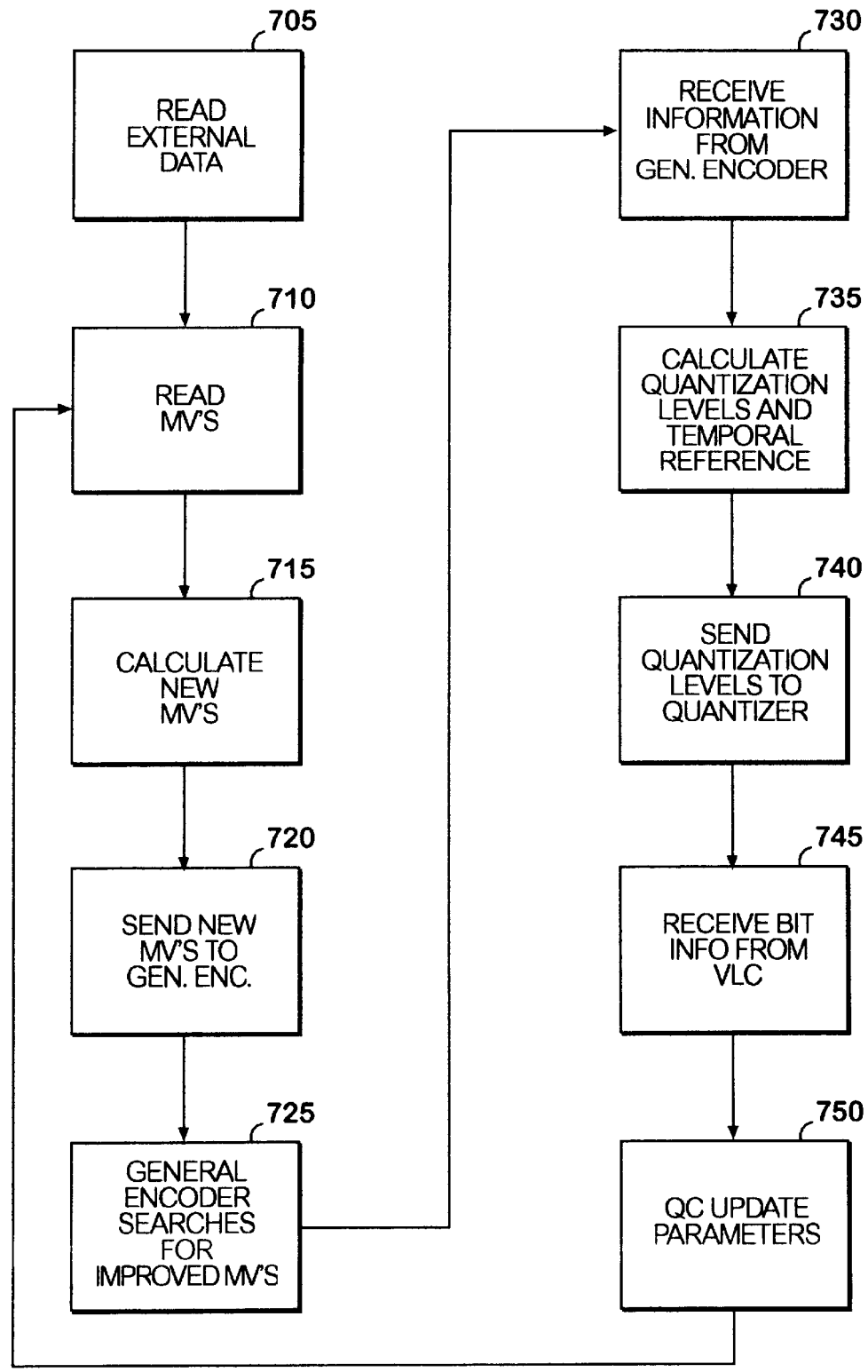
FIG. 7 is a flow diagram depicting exemplary steps in the operation of a rate control unit.

Further understanding of the operation of the rate control module 180 will be facilitated by referencing the flowchart shown in FIG. 7. While the rate control unit 180 can perform numerous functions, the illustration of FIG. 7 depicts exemplary steps in the operation of a rate control unit such as rate control unit 180. The context of this description is the reuse of motion vectors; in practice those skilled in the art will appreciate that other information can be exploited in a similar manner.

At step 705, the communications module 610 within the rate control unit 180 reads external instructions for the user desired picture quality and frame rate. At step 710, communications module 610 reads the motion vectors of the incoming frames from all of the generalized decoders that are sending picture data to the generalized encoder. For examples if the generalized encoder is transmitting a continuous presence image from six incoming images, motion vectors from the six incoming images are read by the communications module 610. Once the motion vectors are read by the communications module 610, the motion vectors are transferred to the side information module 620.

At step 715, the quality control module 630 instructs the side information module 620 to calculate new motion vectors using the motion vectors that were retrieved from the generalized decoders and stored, at step 710, in the side information module 620. The new motion vectors may have to be generated for a variety of reasons including reduction of frame hopping and down scaling. In addition to use in generating new motion vectors, the motion vectors in the side information module are used to perform error estimation calculations with the result being used for further estimations or enhanced bit allocation. In addition, the motion vectors give an indication of a degree of movement within a particular region of the picture, or region of interest, so that the rate control unit 180 can allocate more bits to blocks in that particular region.

At step 720, the quality control module 630 may instruct the side information module 620 to send the new motion vectors to the generalized encoder via the communications module 610. The generalized encoder may then refine the motion vectors further. Alternatively, due to constraints in processing power or a decision by the quality control module 630 that refinement is unnecessary, motion vectors may not be sent. At step 725, the generalized encoder will search for improved motion vectors based on the new motion vectors. At step 730, the generalized encoder will return these improved motion vectors to the quality control module 630 and will return information about the frame and/or block quality.

At step 735, the quality control module 630 determines the quantization level 25 parameters and the temporal reference and updates the external devices and user with this information. At step 740, the quality control module 630 sends the quantization parameters to the quantizer 175. At step 745, the rate control unit 180 receives the bit information from the VLC 190 which informs the rate control unit 180 of the number of bits used to encode each frame or block. At step 750, in response to this information, the quality control module 630 updates its objective parameters for further control and processing returns to block 710.

The invention described above may be implemented in a variety of hardware configurations. Two such configurations are the "fat port" configuration generally illustrated in FIG. 8 and the "slim port" configuration generally illustrated in FIG. 9. These two embodiments are for illustrative purposes only, and those skilled in the art will appreciate the variety of possible hardware configurations implementing this invention.

Figure 8:
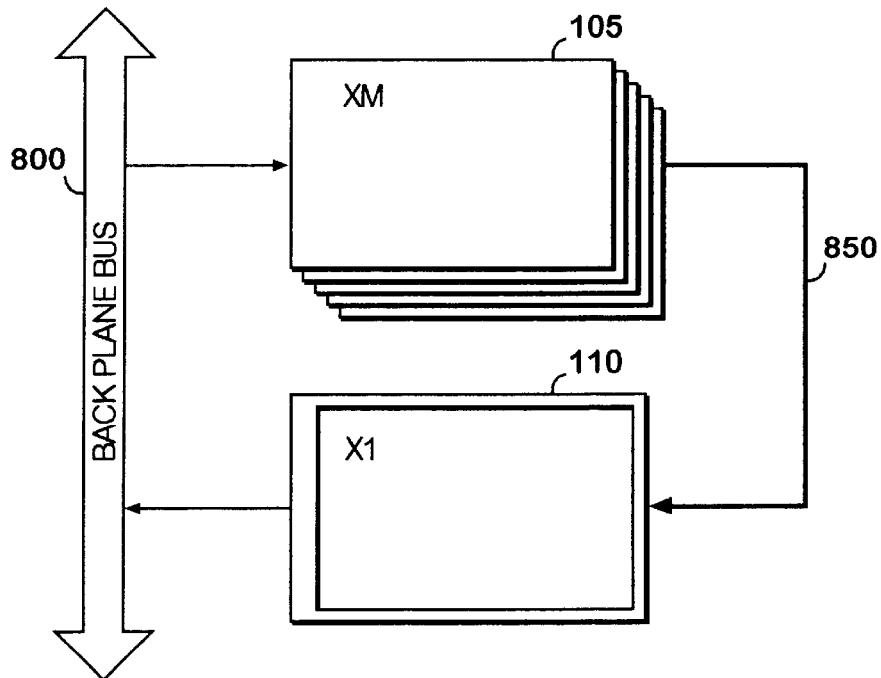
FIG. 8 illustrates an exemplary embodiment of the present invention operating within an MCU wherein each endpoint has a single dedicated video output module and a plurality of dedicated video input modules.

FIG. 8 illustrates an exemplary embodiment of the present invention operating within an MCU wherein each endpoint has a single dedicated video output module 110 and a plurality of dedicated video input modules 105. In this so called "fat port" embodiment, a single logical unit applies all of its functionality for a single endpoint. Incoming video streams are directed from the Back Plane Bus 800 to a plurality of video input modules 105. Video inputs from the Back Plane Bus 800 are assigned to a respective video input module 105. This exemplary embodiment is more costly than the options which follow because every endpoint in an n person conference requires n−1 video input modules 105 and one video output module 110. Thus, a total of n·(n−1) video input modules and n video output modules are needed. While costly, the advantage is that end users may allocate the layout of their conference to their liking. In addition to this "private layout" feature, having all of the video input modules and the video output module on the same logical unit permits a dedicated data pipe 850 that resides within the logical unit to facilitate increased throughput. The fact that this data pipe 850 is internal to a logical unit eases the physical limitation found when multiple units share the pipe. The dedicated data pipe 850 can contain paths for both the primary data channel and the side information channel.

Figure 9:
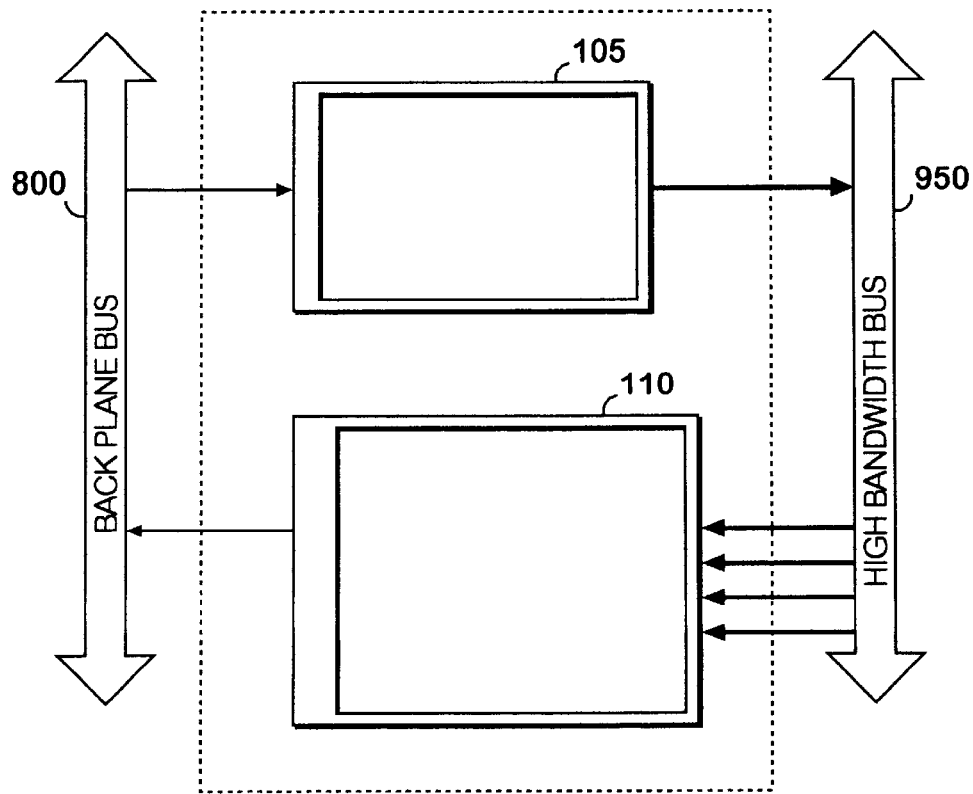
FIG. 9 illustrates an exemplary embodiment of the present invention having a single video input module and a single video output module per logical unit.

FIG. 9 illustrates an exemplary embodiment of the present invention with a single video input module and a single video output module per logical unit. In an MCU in this "Slim Port" configuration, a video input module 105 receives a single video input stream from Back Plane Bus 800. After processing, the video input stream is sent to common interface 950 where it may be picked up by another video output module for processing. Video output module 110 receives multiple video input streams from the common interface 950 for compilation in the editor and output to the Back Plane Bus 800 where it will be routed to an end user codec. In this embodiment of the invention, the video output module 110 and video input module 105 are on the same logical unit and may be dedicated to serving the input/output video needs of a single end user codec, or the video input module 105 and the video output module 110 may be logically assigned as needed. In this manner, resources may be better utilized; for example, for a video stream of an end user that is never viewed by other end users, there is no need to use a video input module resource.

The configuration where the video input module 105 and the video output module 110 may be logically assigned as needed as a separate input port or output port respectively is referred as "Distributed Port" configuration. A video input module 105, is referred as an input port 105 and a video output module 110, is referred as an output port 110.

Each input port 105 may be assigned to a participant. The assignment can be for the whole duration of the conference or it can be dynamically changed during the conference from one participant to the other. Each output port 110 may be assigned to a participant or group of participants or to all the participants in the conference. The logical connection of certain input ports and certain output ports to the same conference is temporary for said conference, in another conference the same input port may be connected to other output ports.

The video input port 105 grabs the appropriate input compressed video stream from the Back Plane Bus 800 according to the momentary assignment from the host.

After processing, the input port sends the decoded video data to the common interface 150 from where it may be grabbed by one or more video output ports 110 for additional processing. The output port performs the same functionality as the output module, as described above in reference to FIG. 1, and transfer the compressed output signal to the appropriate, one or more, endpoints via the back plane 800.

In a distributed configuration, the video output port 110 and video input port 105 are separate logical units and may be dedicated to serve the input/output video needs of different codecs of one or more endpoints. The video input port 105 and the video output port 110 may be logically assigned as needed. In this manner, resources may be better utilized. Moreover, in a case where a video stream of an end user is never viewed by other end users, there is no need to use a video input port for processing its compressed video.

Usually in multipoint conferences several clusters of endpoints with the same communication mode can be found. Communication mode is a set of parameters that is used by an endpoint while connecting to a video-conference, e.g. bit rate, resolution, Frame rate, compression standards, layout etc.

In such environmental a single output port may serve several endpoints of the same cluster without reducing quality or functionality of the conference in comparison to the case where an output port is allocated per each participant.

For example, in a conference with 20 participants using a 1×2 (two way) layout and three communication clusters, the conference may use only 9 output ports instead of 20 output ports, according to the following exemplary method for calculating the amount of necessary ports. The number of output ports, or more generally Output Resources (OR), is equal to the minimum of the number of participants (P) in the conference and the number of rectangles in the layout (L) plus one (2+1=3) times the number of communication clusters (C), OR=Minimum $\{P, (L+1)*C\}$.

In the above case, only 3 input ports are used. Two are used to generate the layout of the conference, and one is used to generate the layout of the active participants. An exemplary method for selecting the amount of Input Resources (IR) may use the formula, IR=Minimum $\{P, (L+1)\}$.

Another aspect of the present invention is a new method for allocating video resources to a conference with a known number of participants according to the conference profile defined by the conference moderator. This method is called "Level of Service."

The video resources include the amount or number of input ports and output ports that will be assigned to the conference.

The profile of a conference may include parameters such as, but not limited to, bit rate, resolution, compression standards, types of layouts, and the amount or number of different layouts in the conference.

The number of video resources that can be allocated to a conference can be varied from one input port and one output port for the entire conference, up to one input port and one output port for each participant.

For example, the MCU may offer a selection of the appropriate service levels according to the conference requirements. The offering can be based on the response of the conference moderator to a form that defines the profile of the conference. Then, the MCU processes the profile of the conference and may offer several levels of service. The following are a few examples:

In the case of a conference of 9 participants with terminals using the same communication mode, three levels of service may be offered, which are listed below.

Level 1 offers a 2×2 layout and uses four input ports and a single output port for the entire conference. The host routes the compressed video from each participant of the selected 4 active participants to the appropriate input port, which is selected from the four input ports, and multicasts the compressed video output from the output port to all participants. All participants see the same layout, and each active participant sees herself or himself and the other three participants.

Level 2 is an enhancement of level 1 in that five participants are allowed, and the active participants do not see themselves. Therefore, the resource allocation for level 2 is 5 input ports and 5 output ports.

In level 3, all the participants can be viewed, and each participant can select his or her layout. In this level of service, 9 input ports and 9 output ports are used; one input port and one output port are used for each participant.

Those skilled in the art will appreciate that those three levels are given by way of example, other numbers or other types of levels may be used.

The moderator then selects the appropriate level of service and that selection gives the moderator influence on the resource allocation for the conference. The offering of the level of service may be associated with a cost and may bind performance to price.

Another exemplary method of offering a level of service may provide an output port for each type of communication mode; the total number of output ports for this level of service is the same as the number of communication clusters in the conference. Each output port is configured to a different cluster of encoded video stream, according to the compression standard, the bit rate, the desired layout, the resolution, etc. Those video output ports 110 grab multiple video input streams, according to the layout, from the common interface 150, for compilation in the output port and broadcast to the Back Plane Bus 800 where the compiled video stream will be grabbed by at least one end user or endpoint that has a terminal that matches the type of output stream.

An MCU using the fat port configuration may also offer a level of service functionality offering several levels of service, because the fat port comprises a plurality of input modules and one output module. For example, a single fat port can be assigned to a continuous presence conference in which all the participants use the same compression standard and the same bit rate. In such a case, one input module is assigned to each endpoint that is visible in the conference. The compressed input signals of the relevant endpoints are transferred to the appropriate input modules of the relevant fat port. The fat port processes the input streams from those endpoints and transfers the compressed output signals to the appropriate end points. The operation of the fat port is described in relation to FIG. 8. The level of service in the conference of FIG. 8 is limited to a single layout having endpoints with the same bit rate, the same resolution, and the same compression standard.

Those skilled in the art will appreciate that in cases of conferences with more than one layout or more than one communication cluster, more expensive levels of service can be offered (e.g., the conference moderator may be offered more than one fat port to a conference, one fat port for each layout and/or for each type of endpoint up until the most expensive level of service in which every endpoint receives its compressed video from its own fat port with a layout and bit rate tailored for the endpoint, etc.).

Because of the reduction in digital processing caused by the present architecture, including this reuse of video parameters, the video input modules 105 and the video output modules 110 can use microprocessors like digital signal processors (DSP's) which can be significantly more versatile and less expensive than the hardware required for prior art MCU's. Prior art MCU's that perform full, traditional decoding and encoding of video signals typically require specialized video processing chips. These specialized video processing chips are expensive, "black box" chips that are not amenable to rapid development. Their specialized nature means that they have a limited market that does not facilitate the same type of growth in speed and power as has been seen in the microprocessor and digital signal processor ("DSP") field. By reducing the computational complexity of the MCU, this invention facilitates the use of fast, rapidly evolving DSP's to implement the MCU features.

From the foregoing description, it will be appreciated that the present invention describes a method of and apparatus for performing operations on a compressed video stream and offering of a new method of video resources allocation. The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is described by the appended claims and supported by the foregoing description.

What is claimed is:

1. An apparatus for manipulating compressed digital video messages received from at least one compressed video source of a plurality of compressed video sources to form manipulated compressed video output and for sending the manipulated compressed video output to at least one of a plurality of compressed video destinations, the apparatus comprising:

a common interface;

at least one video input port being operative to grab a compressed video input signal from the at least one compressed video source, to decode the compressed video input signal for generating a video data stream, and to transfer the video data stream to the common interface; and at least one video output port being operative to grab the video data stream from the common interface, to encode the video data stream forming a compressed video output stream, and to transfer the compressed video output stream to at least one destination of the plurality of compressed video destinations;

wherein no permanent logical relation or connection exists between the at least one video input port and the at least one video output port, and the at least one video input port and the at least one video output port are arranged in a distributed configuration having a temporary logical connection based on current requirements of a current session;

whereby use of the distributed configuration improves resource allocation of the apparatus.

2. The apparatus of claim 1 wherein the at least one video output port grabs the video data stream form the common interface based on a layout associated with a conference.

3. The apparatus of claim 1 wherein the at least one video input port grabs the compressed video input signal from a currently visible video source in at least one layout that is currently being used in a session.

4. A method of offering a level of service to a video conference, the method comprising:
   offering levels of service to a conference moderator, different levels of the levels of service requiring different amounts of video resources; and
   assigning one or more video resources to the video conference based on a selected level of service.

5. The method of claim 4 wherein the offering is based on processing a profile associated with the video conference.

6. The method of claim 4 wherein the one or more video resources is selected from the group consisting of input port, output port, and fat port.

7. The method of claim 4 further comprising:
   routing a compressed video input signal of an input endpoint to an input module;
   processing the compressed video input signal using the input module;
   routing decoded video data of a set of input modules to output modules;
   processing the decoded video data to form a single compressed video output signal using one output module of the output modules; and
   transferring the single compressed video output signal to a receiving endpoint.

8. The method of claim 5, wherein the offering of levels of service takes into consideration at least one parameter selected from a group of parameters consisting of: how many different compression standards are involved in the video conference, how many different resolution are involved in the video conference, which type of layout is used in the video conference, how many types of layouts are in use in the video conference, how many different bit rates are in use in the video conference, and how many different frame rates are in use in the video conference.

9. The method of claim 6, wherein the assigning further comprises assigning one output port for each requested compression standard thereby binding a resources allocation associated with a video processing device with needs of the video conference and not with how many participants are in the video conference.

10. The method of claim 6, wherein the assigning further comprises assigning one output port for each requested bit rate.

11. The method of claim 6, wherein the assigning further comprises assigning one output port for each requested layout.

12. The method of claim 6, wherein the assigning further comprises assigning one output port for each requested resolution.

13. The method of claim 6, wherein the assigning further comprises assigning one output port for each requested frame rate.

14. The method of claim 7, wherein the receiving endpoint uses a compression standard that is used for the single compressed video output signal.

15. The method of claim 7, wherein the receiving endpoint uses a bit rate that is used for the single compressed video output signal.

16. The method of claim 7, wherein the receiving endpoint uses a resolution that is used for the single compressed video output signal.

17. The method of claim 7, wherein the receiving endpoint uses a layout that is used for the single compressed video output signal.

18. The method of claim 7, wherein the receiving endpoint uses a frame rate that is used for the single compressed video output signal.

19. The method of claim 6, wherein the assigning further comprises assigning one input port for each currently visible source thereby binding a resources allocation associated with a video processing device with layouts used by the video conference and not with how many participants are in the video conference.

20. The method of claim 7, wherein the output module is dedicated to a layout in which the input module participates.

21. A method of offering a level of service to a video conference, the method comprising:
   a conference moderator selecting a level of service, the video conference using a number of fat ports including at least one fat port, a different level of service requiting a different number of fat ports;
   assigning one or more fat ports selected from the number of fat ports to the video conference based on the conference moderator selecting;
   routing compressed video input signas of at least one in endpoint to an input module of the one or more fat ports; and
   processing the compressed video input signals using the one or more fat ports to form a compressed video output stream; and
   transferring the compressed video output stream to at least one receiving endpoint.

22. The method of claim 21, wherein the assigning further comprises assigning one fat port for each requested compression standard.

23. The method of claim 21, wherein the assigning further comprises assigning one fat port for each requested layout.

24. The method of claim 21, wherein the assigning further comprises assigning one fat port for each requested bit rate.

25. The method of claim 21, wherein the assigning further comprises assigning one fat port for each requested resolution.

26. The method of claim 21, wherein the at least one receiving endpoint uses a compression standard that is used by the compressed video output stream.

27. The method of claim 21, wherein the at least one receiving endpoint uses a layout that is associated with the compressed video output stream.

28. The method of claim 21, wherein the at least one receiving endpoint uses a bit rate associated with the compressed video output stream.

29. The method of claim 21, wherein the at least one receiving endpoint has a resolution that is associated with the compressed video output stream.

30. The method of claim 21, wherein the one or more fat ports are assigned to a layout associated with the at least one input endpoint.

31. The method of claim 21, wherein the at least one receiving endpoint is associated with a layout that is generated by the one or more fat ports.

32. The method of claim 21, wherein the assigning further comprises assign one fit port for each requested frame rate.

33. The method of claim 21, wherein the at least one receiving endpoint uses a frame rate generated by the one or more fat ports.

34. The apparatus of claim 1, wherein each video output module composes more than one video data stream into one video data stream before being encoded and transferred to the at least one destination.

35. The method of claim 4 further comprising:
   routing multiple compressed video input signals from a first set of endpoints to multiple input modules, each compressed video input signal being routed from one of the first set of endpoints to one of the multiple input modules; the multiple compressed video input signals, the multiple input modules and the fist set of endpoints having a one to one correspondence;

processing the multiple compressed video input signals using the multiple input modules thereby forming decoded video data, each input module processing a different one of the multiple compressed input signals;

routing the decoded video data from the input modules to multiple output modules, each output module may have decoded video data from multiple input modules routed thereto;

processing the decoded video data to form compressed video output signals, each output module forming one compressed video output signal; and transferring the compressed video output signals from the multiple output modules to a second set of endpoints, each video output module having the single compressed video output signal transferred to one or more endpoints of the second set of endpoints.

36. The method of clam 35 wherein the first set of endpoints and second set of endpoints are identical as to which endpoints are included.

37. The method of claim 21, wherein each fat port is associated with multiple input modules and each input module is associated with no more than one video input signal.

38. A processor-based video conference system comprising a medium storing instructions for causing the processor to:

offer levels of service to a moderator of a video conference, different levels of the levels of service requiring different amounts of video resources; and assign one or more video resources selected from the group consisting of input port, output port and fat port to the video conference based on a selected level of service.

39. A processor-based video conference system comprising a medium storing instructions for causing the processor to:

allow a conference moderator of a video conference to select a level of service;

use a number of fat ports including at least one fat port associated with the level of service selected;

route compressed video input signals of at least one endpoint to an input module of an assigned fat port selected from the number of fat ports;

process the compressed video input signals of the at least one endpoint using the assigned fat port forming a compressed video output steam; and transfer the compressed video output s of each fat port to at least one endpoint.

* * * * *

UNITED STATES PATENT AND TRADEMARK OFFICE
CERTIFICATE OF CORRECTION

PATENT NO. : 6,757,005 B1
APPLICATION NO. : 09/952339
DATED : June 29, 2004
INVENTOR(S) : Moshe Elbaz, Noam Eshkoli and Aviv Eiesenberg Page 1 of 1

It is certified that error appears in the above-identified patent and that said Letters Patent is hereby corrected as shown below:

In Column 14, line 62
"video data stream form" should be --video data steam from--.

In Column 16, lines 18 - 19
"input signas of at least one in endpoint"
should be --input signals of at least one input endpoint--.

In Column 16, line 56
"assign one fit port" should be --assigning one fat port--.

In Column 18, line 23
"video output steam;" should be --video output stream--.

In Column 18, line 24
"output s of each fat port" should be --output stream of each fat port--.

Signed and Sealed this

Seventeenth Day of July, 2007

JON W. DUDAS
*Director of the United States Patent and Trademark Office*